United States Patent
Hunter et al.

(10) Patent No.: US 6,731,599 B1
(45) Date of Patent: May 4, 2004

(54) AUTOMATIC LOAD SHARING-TRUNKING

(75) Inventors: Van Hunter, San Jose, CA (US); Joseph Regan, Sunnyvale, CA (US); Alfred Nothaft, Keller, TX (US); Akhil Duggal, Pleasanton, CA (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/346,870

(22) Filed: Jul. 1, 1999

(51) Int. Cl.[7] .............................. H04L 12/56; H04J 3/14
(52) U.S. Cl. ...................... 370/229; 370/401; 709/105
(58) Field of Search .................................. 370/401, 218, 370/390, 432, 351, 468, 229, 230, 230.1, 237; 709/105

(56) References Cited

U.S. PATENT DOCUMENTS

| 4,149,233 A | | 4/1979 | Frosch et al. | |
|---|---|---|---|---|
| 5,987,117 A | | 11/1999 | McNeil et al. | |
| 6,016,310 A | * | 1/2000 | Muller et al. | 370/255 |
| 6,069,894 A | * | 5/2000 | Holender et al. | 370/397 |
| 6,081,511 A | * | 6/2000 | Carr et al. | 370/256 |
| 6,104,696 A | * | 8/2000 | Kadambi et al. | 370/218 |
| 6,147,995 A | * | 11/2000 | Dobbins et al. | 370/392 |
| 6,151,297 A | * | 11/2000 | Congdon et al. | 370/216 |
| 6,272,151 B1 | * | 8/2001 | Gupta et al. | 370/489 |

FOREIGN PATENT DOCUMENTS

| EP | 0 863 646 A2 | 9/1998 |
|---|---|---|
| EP | 0 910 195 A2 | 4/1999 |

OTHER PUBLICATIONS

Conant, G. E.: "Multilink PPP: One Big VCirtual Wan Pipe," Data Communications, McGraw Hill, New York, U.S., vol. 4, No. 13, Sep. 21, 1995, pp. 85–88, XP000526197.

\* cited by examiner

*Primary Examiner*—Chau Nguyen
*Assistant Examiner*—Soon-Dong Hyun
(74) *Attorney, Agent, or Firm*—Neil G.J. Mothew (57) ABSTRACT

A method and apparatus is described which pertains to load sharing/trunking in a communication device used in unicast and/or multicasting interchange of information. A plurality of available ports in the interface cards of the device is identified. More than one port is selected to be configured as a Multi-Link Trunk (MLT) even through the ports may be located on different interface cards.

19 Claims, 4 Drawing Sheets

AUTOMATIC LOAD SHARING-TRUNKING

FIELD OF THE INVENTION

A method and apparatus is described that pertains to load sharing/trunking in a communication device used in unicast and/or multicast interchange of information.

BACKGROUND

Networking is generally known as a configuration of computers, software and communication devices interconnected together as to facilitate the interchange of information. A networking system may be divided into a plurality of links. One type of link is a local area network (LAN) that connects a plurality of computers together within a close proximity. Another link type is a wide area network (WAN) which connects a plurality of LANs over greater distances.

For information traffic purposes, information transmitted through the networking system is generally segmented into quantifiable packets known as "frames" or "cells" depending on the type of communication protocol used in the system. One such protocol is the asynchronous transfer mode (ATM) in which information is segmented into a plurality of fixed length packets called cells. The cells are then attached with destination addresses and transmitted at predetermined transmission rates through the networking system until the cells reach their destination which usually are "ports."

Network devices such as "switches" allow users, servers, and LANs to communicate over the networking system. As an example, switches known as "edge switches" contain interface cards that allow users, servers, and LANs to communicate with "core" devices that perhaps make up the WAN. "Core switches" on the other hand, also known as "trunk cards", generally contain WAN interface cards to communicate with other core switches.

An interface card generally has one or more physical ports that send or receive information that may be segmented, such as cells. A switch interconnects the physical ports on one interface card to the physical ports on another interface card to facilitate information interchange in the networking system. Each physical port becomes a "source" port or a "destination" port depending on whether the port is transmitting or receiving information. In addition, each physical port is assigned an "address" which becomes a "source" address or a "destination" address again depending on whether the port is transmitting or receiving information.

One type of trunk card contains a plurality of ports that are physically designated as a Multi-Link Trunk (MLT). A "Multi-Link Trunk" (MLT) is a group of physical ports associated together to act as one logical port. As an example, a group of 100 megabytes per second (Mbps) ports can be associated together for increasing bandwidth between two devices where a gigabyte ethernet is either unavailable or deemed too costly. However, a problem associated with such trunk cards is that if one of the ports failed, the bandwidth of the MLT is reduced proportionally. In the case where the reduced bandwidth is insufficient for the link, the information interchange through the MLT is suspended.

Using MLT presents other problems. For example, in multicast or broadcast situation, traffic received on one port of the interface card should only broadcast out on one port of an MLT. Otherwise, undesirable echoes would result at the destination end of the MLT. In a previous method, one port of the MLT was designated as a multicast port. Thus, that port transmitted all the information related to multicast. A problem exists in that the information transmitted is not load shared. Thus, the bandwidth of the multicast link is limited to the bandwidth of the designated multicast port. Moreover, a failure of the designated port causes a multicast failure of the link represented by the port.

Widespread use of the networking system are made by various entities such as telecommunication companies, brokerage firms, banks, large manufacturing companies, electronic commerce and so forth. For these entities, reliability is of utmost importance. A breakdown of information interchange in the links within the networking system generally brings about great economic loss and hardship.

SUMMARY

A method and apparatus is described which pertains to load sharing/trunking in a communication device used in unicast and/or multicasting interchange of information. In one embodiment, a plurality of available ports in the interface cards of the device is identified. A group of the available ports is selected to be configured as a Multi-Link Trunk (MLT) even though the ports may be located on different interface cards. Many advantages are attainable from the above configuration.

For example, because any suitable ports may be selected for the MLT, the bandwidth of the MLT is scalable to accommodate the transmission rate required of the MLT. Also, if one of the selected ports fail, another port is selected from the table that is suitable for the MLT. In this manner, the resiliency of the MLT is sustained.

In one embodiment, a load sharing/trunking circuit generates an identification for the packet to be transmitted in an MLT and uses the identification to determine the physical port in which the data is to be transmitted. One advantage is that packets belonging to the same conversation are transmitted in the same physical port while achieving reasonable load sharing. This overcomes a problem in which packets of the same conversation is transmitted to a destination through different physical ports. Such packets may arrive at the destination in a different sequential order which complicates the de-segmentation of the packets.

In one embodiment, problems associated with implementing an MLT in a flooded traffic situation such as multicast or broadcast are overcome. According to the embodiment, the load sharing/trunking circuit selects an Multicast Group Identification (MGID) which identifies a plurality of physical ports in which packets are to be multicasted. One advantage is that packets to be multicasted are load shared in an MLT in a multicasting environment.

Additional features, embodiments, and benefits will be evident in view of the figures and detailed description presented herein.

DETAILED DESCRIPTION

A method and apparatus is described that pertains to load sharing/trunking in a communication device used in a unicast (single destination) and/or multicast (multiple destination) interchange of information. The communication device may be used in a networking system. In one embodiment, the communication device may be a switch in a networking system. A Multi-Link Trunk (MLT) is a group of physical ports associated together to act as one logical port. As an example, a group of 100 megabytes per second (Mbps) ports can be associated together for increasing bandwidth between two devices where a gigabyte ethernet is either unavailable or deemed too costly.

Various embodiments and illustrations will now be described to aid in the understanding of the invention and should by no means be construed as limitations to the invention. For example, although specific embodiments are described, the embodiment can be implemented as hardware such as a processor controlled circuit or as an electronic circuit such as application specific integrated circuit (ASIC) perhaps without an intervention of a central processing unit (CPU). When implemented as software, the program or code segments can be stored in a processor readable medium. A processor readable medium may include an electronic circuit, a semiconductor memory device, a magnetic disk, an optical disk, a CD-ROM, a hard disk and the like.

Figure 1:
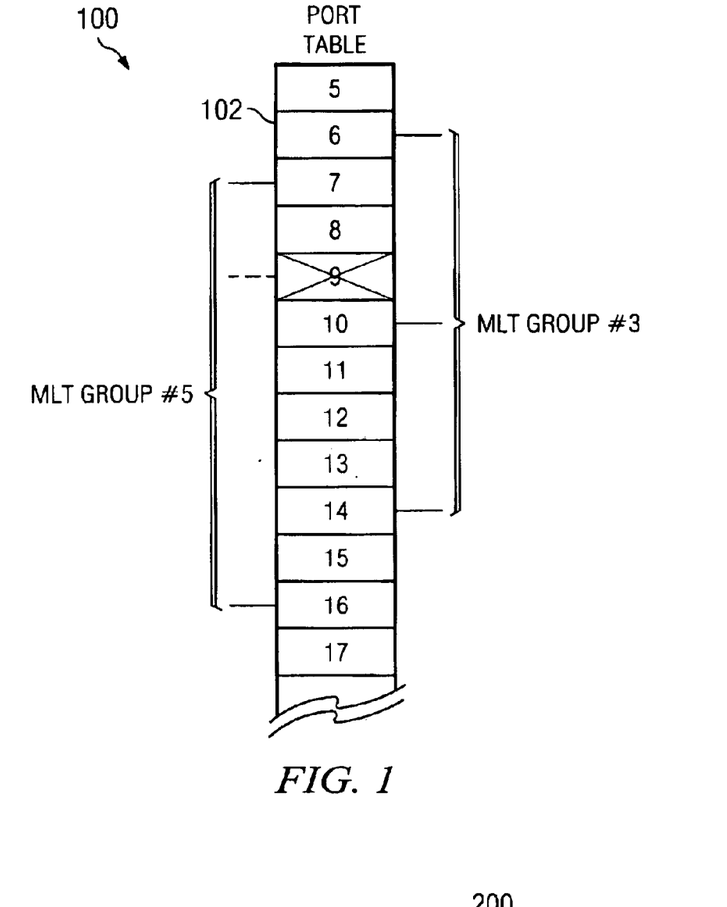
FIG. 1 illustrates a logical diagram of an exemplary table having a plurality of specified port numbers in which Multi-Link Trunks (MLTs) may be formed in accordance with an embodiment of the invention.

FIG. 1 illustrates a logical diagram of an exemplary table having a plurality of specified port numbers in which MLT groups may be formed in accordance with an embodiment of the invention. The table 100 may be stored in a memory of a device such as a switch in a networking system. The port numbers 102 represent a collection of physical ports that are available in the device. When an MLT is to be formed, any port numbers 102 suitable for the MLT may be selected. The ports are not limited to one interface card. Because any suitable ports may be selected for the MLT, the bandwidth of the MLT is scalable to accommodate the transmission rate required of the MLT. As shown in FIG. 1, MLT Group #3 has active ports #6, #10 and #14 in the group. MLT Group #5 has active ports #7 and #16 in the group. Thus, assuming that each port is able to transmit information in a form of packets at 100 Mbps, then Group#3 has a bandwidth of 300 Mbps and Group#5 has a bandwidth of 200 Mbps.

If one of the selected ports fail, another port is selected from the table that is suitable for the MLT. In this manner, the resiliency of the MLT is sustained. As shown in FIG. 1, port #9 that was previously in MLT Group #5 has failed. Upon failure of port #9, MLT Group #5 has disassociated itself with port #9 and selected port #16 to maintain the group's bandwidth. The ports associated with a group may be located at different interface cards. Thus, a port may be routed physically separate from the other ports. One advantage is that if one of the lines is severed, the cause will not affect the remaining lines and the interchange of information is maintained thereby minimizing the impact. The port numbers may also be selected by an MLT depending on the path the packets will follow. For example, sensitive information being interchanged through the network may be transmitted by ports that have lines that pass through a secure area thereby preventing the information from being tapped during transmission.

Figure 2:
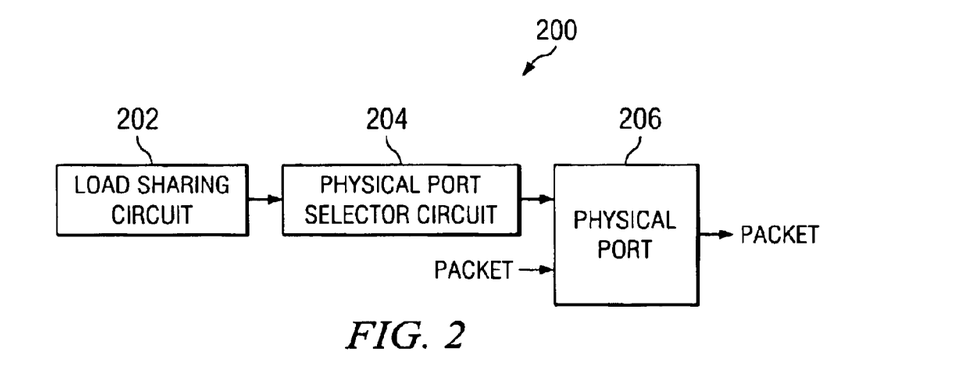
FIG. 2 is a schematic diagram of a circuit that load shares and trunks information in accordance with an embodiment of the invention.

FIG. 2 is a schematic diagram of a circuit that load shares and trunks information in a form of packets in accordance with an embodiment of the invention. The circuit 200 comprises a load sharing circuit 202 and a physical port selector circuit 204. The load sharing circuit 202 determines which port in the MLT the packet is to be transmitted. The physical port selector circuit 204 identifies the actual physical port that constitutes the port of the MLT to be transmitted. The physical port selector circuit 204 indexes the physical port 206 that transmits the packet to its destination. In one embodiment, the packets are loaded in a daisy chain manner into the ports that comprise the MLT. A problem associated with this embodiment is that packets belonging to the same conversation may be transmitted to the destination through different ports. Thus, it is feasible that the packets may arrive at the destination in a different sequential order that complicates the de-segmentation of the packets. To prevent this, it is desirable to transmit packets belonging to the same conversation in the same port while achieving reasonable load sharing.

In one embodiment, this is performed by load sharing based on identifying the packets that belong to the same conversation and distinguishing from packets belonging to different conversations. In one embodiment, this is achieved by developing identification based on the packet's source and destination address ("source-dest pair"), which is fairly random between different source-dest pairs, but same for the same source-dest pair.

Figure 3:
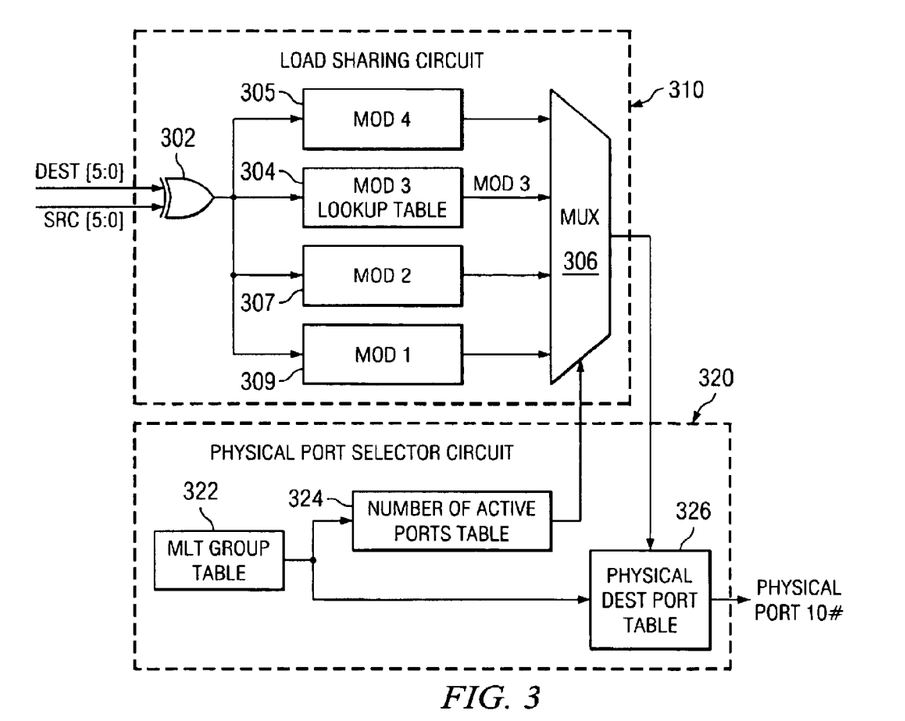
FIG. 3 is a more detailed schematic diagram of a load sharing/trunking circuit in accordance with an embodiment of the invention.

FIG. 3 is a more detailed schematic diagram of a load sharing/trunking circuit in accordance with an embodiment of the invention. This embodiment is suitable for unicast multi-link trunking. Turning to the load sharing circuit 310, the load sharing circuit 310 comprises Exclusive-OR (XOR) gates 302, a plurality of modulus operand (MOD) lookup tables 304, 305, 307, 309 and a multiplexor 306. Each MOD table corresponds to a number of active ports. For example, if the active port is one, MOD 1 table is used; if the active port is two, MOD 2 table is used and so forth. The XOR gates 302 combines a portion if not all of the source address with the destination address of the packet in a manner random enough to achieve an acceptable load sharing. In the embodiment shown in FIG. 3, XOR operation is performed on six least significant bits (LSBs) of the source and destination address to form an identification that is psuedo-random for different source-dest pairs but same for the same source-dest pair. Of course, more or less LSBs may be used to achieve a desired result. Of course, the invention is not limited to this embodiment. For example, in another embodiment, a hashing algorithm may be used.

If a MOD function is used, in one embodiment, the MOD function is performed on the output of the XOR gate by the number of active physical ports that constitute the MLT. Thus if there are three active ports, a multiplexor 306 passes the results of the MOD 3 lookup table 304 through the multiplexor 306. As an example, if six LSBs of the service and destination address are used, the XOR gates 302 generates 64 possibilities of identification. If there are three active ports in the MLT, using a MOD 3 function, the 64 possibilities of identification is transformed into three indices, where each index is associated with a port. The MOD 3 lookup table 304 may be stored in a memory. The output from the MOD lookup table 304 that passes through the multiplexor 306 is used as one of the index that determines the actual physical port in which the packet to be transmitted.

The physical port selector circuit 320 assigns packets to the physical ports that are active in the MLT. As shown in FIG. 3, the physical port selector circuit 320 comprises a plurality of lookup tables 322, 324, 326 which may be stored in memories. The first lookup table 322 is an identifier table that identifies the destination port including the MLTs. An identified MLT in the first lookup table is the MLT, which will transmit the packets. As described above, an MLT is a logical port that comprises a plurality of physical ports. In one embodiment, a portion if not all of the address identifying the MLT is used as an index to the second lookup table 324 which indicates a number of active ports for a particular identified MLT. In the illustrated embodiment, three LSBs of the MLT are used to look up the second lookup table 324 to determine the number of active ports in the MLT Group.

The MLT identifier from the first lookup table 322 is also used as an index in conjunction with the index produced by the load sharing circuit 310 described above to select an actual physical port in a third lookup table 326. The third lookup table 326 comprises a plurality of actual physical port addresses that have been selected for use in the MLTs. The selected physical port is the port in which the packet will be transmitted in the identified MLT.

Figure 4:
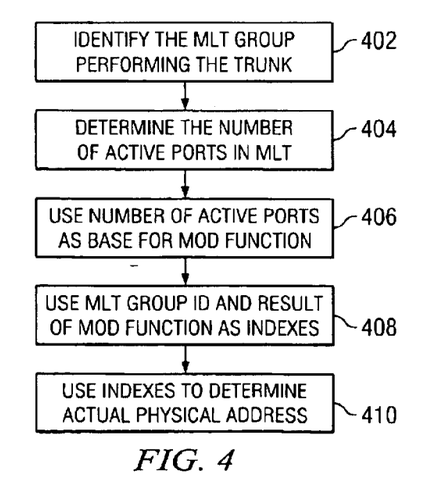
FIG. 4 is a flowchart that shows the operation of the circuit in FIG. 3 in accordance with an embodiment of the invention.

FIG. 4 is a flowchart that shows the operation of the load sharing/trunking circuit in FIG. 3. In block 402, the MLT performing the multi-link trunking is identified. The identity of the MLT may be determined through a lookup table that comprises a plurality of MLT identities. The identified MLT transmits the packet to be sent to a destination. In block 404, the identified MLT ID is used to determine the number of active ports within the MLT. For example, the MLT ID may be the three LSBs of the MLT address. The number of active ports may be determined by using the MLT ID as an index to a second lookup table. Stored in the second lookup table, there is a plurality of registers that store the number of active ports for a given MLT. Using the MLT ID as index, the number of active ports for the MLT is determined. In block 406, once the number of active ports for the MLT is determined, the number of active ports is used as a base for the MOD function that is to be performed on the source-dest pair of the packet. The MOD function produces an identity that is fairly random for packets of different source-dest pair but same for the same source-dest pair. One advantage is that packets of the same conversation may be transmitted through the same port while achieving reasonable load sharing. In block 408, the result of the MOD function is used as one of the index to a third lookup table. In a MOD 3 function, the index may be index 0, 1, 2. The MLT identifier from the first lookup table is also used as an index to the third lookup table. The third lookup table comprises a plurality of the actual physical port addresses of the various MLTs included in the first lookup table. Thus, the MLT identifier identifies the particular group of physical ports that belong to the particular MLT. The index from the load sharing circuit indexes which physical port the packet is to be transmitted. For example, actual physical port 1 may correspond to index 0, actual physical port 2 may correspond to index 1, and actual physical port 3 may correspond to index 2. In block 410, the actual physical port is identified and the packet is transmitted.

The configuration of the circuit as described in FIG. 3 allows for a transformation of the characteristics of the circuit. For example, resiliency of the circuit can be maintained by altering the contents of the lookup tables. Assuming one of the active ports in an MLT having three active ports has failed, a polling software that polls the active ports will detect the failure. Once detected, a processor overseeing the circuit will reconfigure the second lookup table to reflect that the affected MLT now has only two active ports. The second lookup table changes the base of the MOD function of the load sharing circuit such that a MOD2 operation is performed on the source-dest pair of the packet. The processor may further reconfigure the third lookup table with the actual physical port addresses to eliminate the failed port and to correspond the physical ports with the index from the load sharing circuit while reflecting the actual physical ports that belong to the MLT.

Furthermore, if one of the active ports in the MLT has failed, the MLT could replace the failed port with a new active port. In this instance, the second lookup table remains unchanged and the address of the failed actual physical port is replaced with the new address of the replacing actual physical port in the third lookup table. In another example, the MLT may increase the number of active ports to accommodate an increased bandwidth. In this instance, the second lookup table is changed to reflect the increased number of active ports for that MLT. The third lookup table is also changed to include a new actual physical port or ports that are now part of the MLT with the increased number of active ports.

In another example, to obtain a secured communication link, the third table has a plurality of actual physical ports belonging to an MLT that pass only through secured area. Thus, when a secured interchange of information needs to be made, the information is channeled through the above-mentioned MLT.

Figure 5:
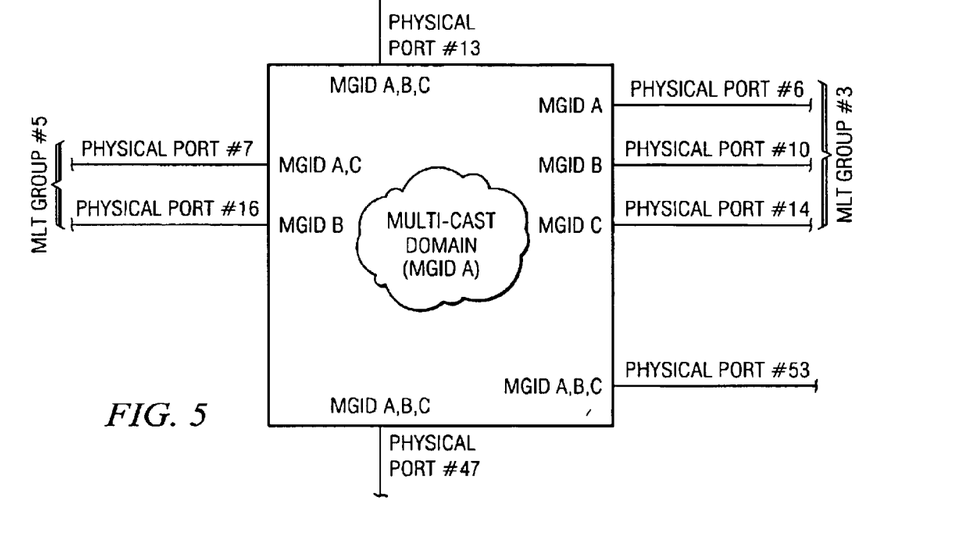
FIG. 5 is a logical diagram of a loading sharing circuit in accordance with one embodiment of the invention.

FIG. 5 is a logical diagram of a load sharing/trunking device in accordance with an embodiment of the invention. This embodiment is suitable for multicast multi-link trunking. Implementing an MLT in a multicast/broadcast or unknown destinations environment presents a problem for flooded traffic, in that packets received on a physical port of the MLT should not be echoed back out into other physical ports within the MLT. Further, packets received on a non-MLT port should be flooded out through one physical port of the MLT. In one embodiment, the circuit is assigned internally to a Multicast Group Identification (MGID). In the circuit having an MLT, the MGID includes one physical port of the MLT. MGID is an ID that is mapped to a set of specific physical ports and does not map to a logical port such as MLT in a multicast. Flooded traffic entering on different physical ports of the MLT are assigned to different MGIDs to prevent echoing out through other physical ports in the MLT. Flooded traffic from non-MLT ports are also assigned different MGIDs to load share such traffic through different physical ports in the MLT. An example is given below.

In FIG. 5, the physical ports and the MLTs have been arbitrarily chosen to illustrate the operation of load sharing/trunking circuit in multicasting situation. The highest number of physical ports comprising an MLT is determined. In this instance, MLT group #3 has the highest number of active ports which is three. Accordingly, three MGIDs are assigned. In this example, for MLT group #3, MGID A is assigned to port #6, MGID B is assigned to port #10, and MGID C is assigned port #14. For MGID group #5, port #7 is assigned MGID A and MGID C, and port #16 is assigned MGID B. For the non-MLT ports, (i.e., port #13, port #47, and port #53) all three MGIDs (e.g., MGID A, MGID B, and MGID C) are assigned. Flooded traffic is sent out of the circuit through the ports identified by an MGID. For example, if a packet is to be sent out of the physical ports identified by MGID A, port #6, port #7, port #13, port #47, and port #53 will be the transmitting ports. However, to accommodate load sharing, the MLTs may not transmit the packet on ports identified by MGID A and a different port identified by a different MGID may be used to transmit the packets as will be described further below.

In one embodiment, a key or master MGID to a set of MGIDs servicing the multicast domain (e.g., the circuit of FIG. 5) and the MLT ports is desirable because Media Access Control (MAC) address records are stored based on MAC address and MGID. Stated differently, a MAC address is known (or unknown) within a specific multicast group (MGID). To know a MAC address within four different MGID domains require four different MAC address records. Thus, being able to store a MAC address once for one MGID describing a multicast domain containing an MLT is better than having to store the MAC address records four times.

Two tables may be used to implement the scheme to conserve MAC address record space and make the software management of multicast domains containing MLTs easier. The first table has one entry per MGID to detail what is the highest number of physical ports included in any MLT contained within the MGID's multicast domain. This is equal to the number of MGIDs associated together in this one domain. For MGID domains containing no MLT ports, the number is one and the MGID merely maps itself. The table is stored in a memory.

For flooding MGID domains containing MLTs, one of the associated MGIDs is chosen as Master MGID and assigned. For example, in the FIG. 5, the circuit is assigned MGID A as the master MGID. The second table has one entry per MGID. Each entry in the second table contains the associated MGIDs. The key MGID could be inferred to be the first of these, but the table makes it easy to explicitly express all associated MGIDs in the entry. The second table can be referred to as MLT Multicast Table.

Below is an example of an MLT Multicast Table which may be stored in a memory.

will transmit the received packet. Although port #6 and port #7 of the MLTs have been selected to be the transmitting port, the packet to be transmitted is subject to be diverted to different ports in the MLT as to facilitate load sharing. For example, the transmitting ports may be port #16 and port #10.

In the event a packet is received in one of the ports that comprise the MLT, the assignment of the multicast domain is ignored and the MGID of the port that received the packet becomes the MGID of the ports in which the packet will be transmitted. For example, if physical port #10 of MLT Group #3 has received a packet, because port #10 belongs to MGID B, the physical ports identified by MGID B will be the transmitting ports of the packet. This procedure is performed because a packet received in a port of an MLT should not be transmitted out of any of the ports that comprise the MLT. If the multicast domain which is MGID A is assigned as transmitting ports to the packet received by port #10, the packet will be transmitted out of port #6 identified by MGID A. The result will be an undesirable echo in the MLT group #3. By assigning the MGID of the port that received the packet if the port is part of an MLT, echoing does not result because a receiving port does not re-transmit the packet back into the link. Reasoning loading is assumed to be achieved by the procedure above because packets transmitted in an MLT group are reasonable loaded at the source of the transmitting MLT group.

Figure 6:
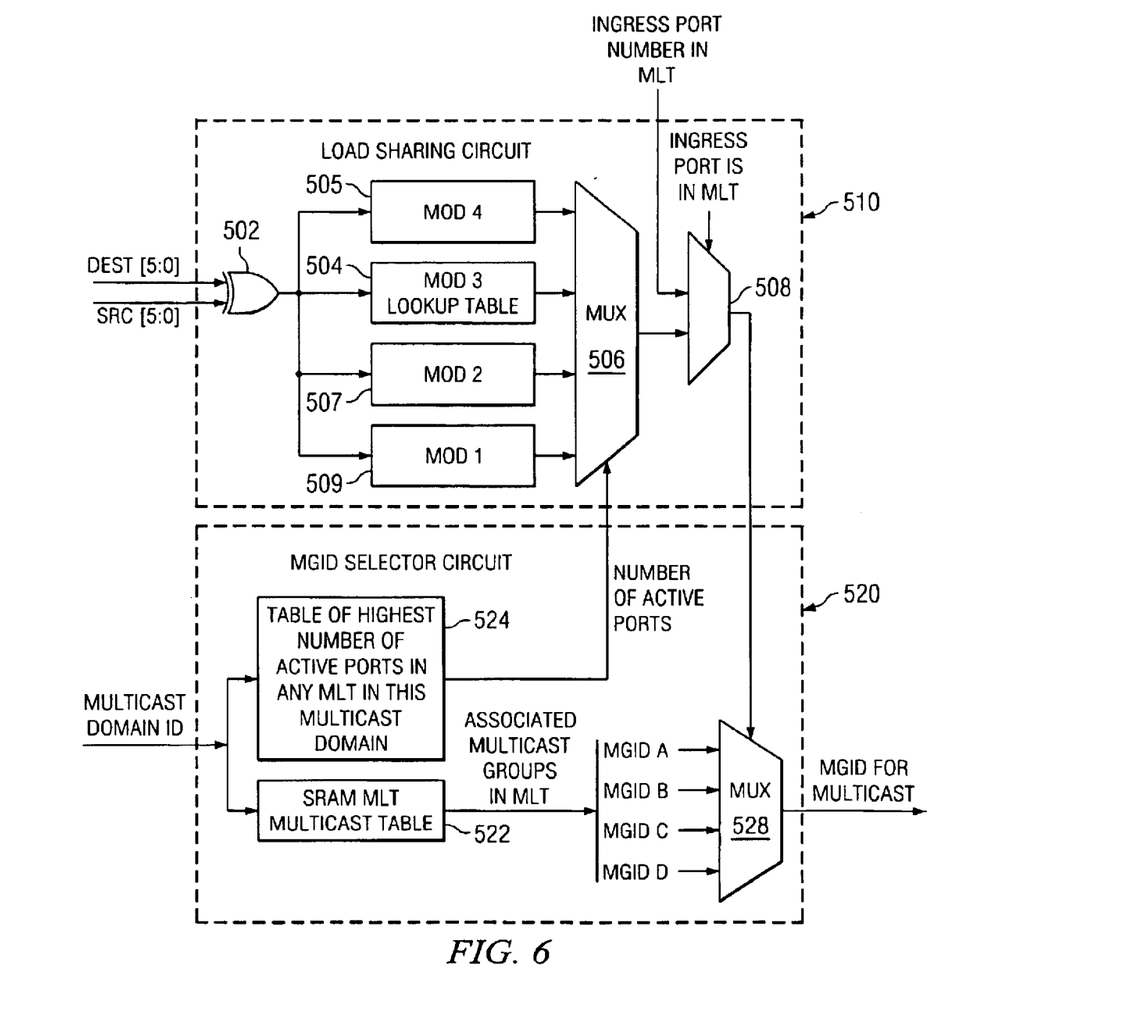
FIG. 6 is a schematic diagram of a load sharing/trunking circuit suitable for multicasting multi-link trunking in accordance with an embodiment of the invention.

FIG. 6 is a schematic diagram of a load sharing/trunking circuit suitable for multicasting multi-link trunking in accordance with an embodiment of the invention. In particular, the load sharing circuit 510 comprises a plurality of XOR gates 502, a plurality of MOD lookup tables 504, 505, 507, 509, a first multiplexor 506, and a second multiplexor 508. The XOR gates 502 combine a portion if not all of the source address with the destination address of the packet in a manner random enough to achieve an acceptable load shar-

| SRAM ADDRESS | 31 | 16 | 15 | 0 |
|---|---|---|---|---|
| N | Key 0 MGIDs for MLT Ports 0 & 1 | | Key 0 MGIDs for MLT ports 2 & 3 | |
| N+1 | Key 1 MGIDs for MLT ports 0 & 1 | | Key 1 MGIDs for MLY ports 2 & 3 | |
| ... | ... | | ... | |
| N+127 | Key 127 MGIDs for MLT ports 0 & 1 | | Key 127 MGIDs for MLT ports 2 & 5 | |

Referring to FIG. 5, the circuit has been arbitrary assigned multicast domain MGID A (Master MGID). Packets that enter into the device are transmitted by physical ports that are identified by MGID A. In the case where the device does not have any MLTs, the physical ports are the ports identified by MGID A. The received packet is transmitted out of the various ports identified by MGID A excluding the receiving port because the receiving port does not re-transmit the received packet as to prevent echoing in the link. However, as shown in FIG. 5, if the device includes MLTs, although initially, port #6 and port #7 of MLT group #3 and MLT group #5 are identified by MGID A as the transmitting ports, the transmitting ports are changed before transmission as to facilitate load sharing in the MLTs.

In one embodiment, the source-dest pair of the packet is used to determine which port of the MLT the packet is to be transmitted. Details of the assignment of the transmitting port in the MLT will be further discussed with respect to FIG. 6. Thus, assuming that a packet has been received in physical port #47, the transmitting physical ports will be the ports that comprise MGID A. Thus, port #13 and port #53 ing. In the embodiment shown in FIG. 6, XOR operation is performed on the six least significant bits (LSBs) of the source and destination address to form an identification which is pseudo-random for different source-dest pairs but same for the same source-dest pair. Of course, more or less LSBs may be used to achieve a desired result. Of course, the invention is not limited to this embodiment. For example, in another embodiment, a hashing algorithm may be used.

In the embodiment using MOD function, a MOD function is performed on the output of the XOR gate using as a base the number of highest active ports in any MLT groups that are in the multicast domain. Thus, referring to the example on FIG. 5, MLT group #3 will have the highest number of active ports which is three. In this instance, the multiplexor 506 will pass the results of the MOD 3 lookup table 504. The MOD lookup tables may be stored in memories. The output from the MOD lookup table 504 is then passed through the first multiplexor 506 to be used as one of the index in determining the actual physical port (identified as MGID) in which the packet to be transmitted.

In the event the port receiving the packet is part of an MLT, the second multiplexor 508 disconnects the output of the first multiplexor 506 and a signal is transmitted to the MGID selector circuit 520 indicating that the MGID of the receiving port in the MLT is to be used as the MGID of the transmitting ports in the multicast domain.

As shown, the MGID selector circuit 520 assigns the MGID that is to be used by the MLTs in the multicast domain. Using the multicast domain ID, which may be the base address of the key or master MGID, the multicast domain ID points to the set of MGIDs servicing the multicast domain and the associated MLT ports which are stored in table 522. The set of MGIDs retrieved from the table 522 are used as inputs to the third multiplexor 528. The index from the load sharing circuit 510 is used to select one of the MGIDs retrieved from the table 522. The ports identified by the selected MGID are the ports in which the received packet will be transmitted. Thus, using FIG. 5 as an example, the key or master MGID which is MGID A points to MGID A, MGID B and MGID C which service the multicast domain. The index from the load sharing circuit 510 may select MGID B. MGID B identifies the group of physical ports that will transmit the packet. In this instance port #10, port #13, port #16, and port #47 will be the transmitting ports assuming port #53 is the receiving port.

Figure 7:
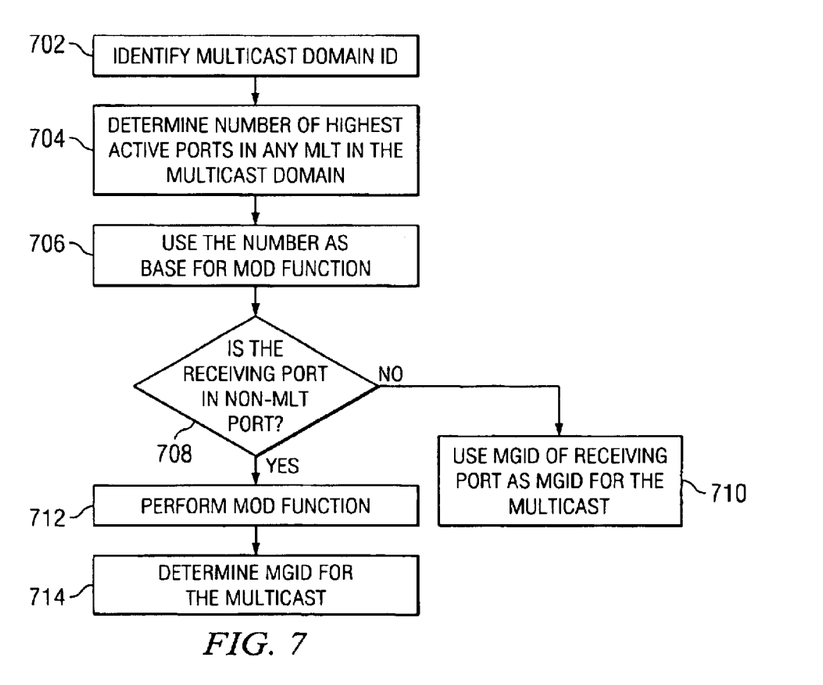
FIG. 7 is a flowchart that shows the operation of the load sharing/trunking circuit of FIG. 6 in accordance with an embodiment of the invention.

FIG. 7 is a flowchart that shows the operation of the load sharing/trunking circuit of FIG. 6. In block 702, the multicast domain ID is identified which is from the key or master MGID. In block 704, the multicast domain ID is used to lookup in a first lookup table the number of highest active ports in any MLT in the multicast domain. The lookup table may be stored in a memory. In block 706, the number of highest active ports retrieved from the first lookup table is used as a base for the MOD function operation of the load sharing circuit. In block 708, a determination is made as to whether the receiving port is a non-MLT port or a port associated with an MLT group. If the receiving port is an MLT port, then in block 710, the MGID of the receiving port is the MGID for multicasting. If the receiving port is a non-MLT port, then in block 712, a MOD function is performed on the source-dest pair of the packet to be transmitted. In block 714, the multicast domain ID is used to point to the set of MGIDs servicing the multicast domain. The set of MGIDs are inputted into a multiplexor. The result of the MOD function is used as a selector on the multiplexor to select the MGID for the multicast.

In the foregoing specification, the invention has been described with reference to specific embodiments thereof. It will, however, be evident that various modifications and changes can be made thereto without departing from the broader spirit and scope of the invention as set forth in the appended claims. The specification and the drawings are accordingly, to be regarded in an illustrative rather than restrictive sense.

What is claimed is:

1. An apparatus comprising:
    a first memory to store a plurality of port addresses, of which a grouping of the port addresses is selected for Multi-Link Trunk (MLT);
    a port selector circuit coupled to the first memory, the port selector circuit to transmit a first signal to the first memory;
    a load sharing circuit coupled to the first memory, the load sharing circuit to transmit a second signal to the first memory, the second signal and the first signal index a port address in the first memory and the indexed port address addresses a port selected to transmit data.

2. The apparatus of claim 1, wherein the first signal of the port selector circuit indexes the grouping of port addresses belonging to the MLT and the second signal of the load sharing circuit indexes one of the port addresses in the MLT indexed by the port selector circuit.

3. The apparatus of claim 1, wherein the load sharing circuit further comprises:
    an identification circuit to generate an identification for the data to be transmitted; and
    an identification indexing circuit to place the identification in one of a plurality of indices, wherein each index has a corresponding physical port in the MLT.

4. The apparatus of claim 3, wherein the identification circuit includes a random generator that assigns the identification to the data.

5. The apparatus of claim 4, wherein the random generator further comprises a first circuit to randomly generate the identification based on at least a portion of one or a source address of the data, a destination address of the data, and both the source address and the destination address of the data.

6. The apparatus of claim 5, wherein the first circuit is a plurality of Exclusive-OR (XOR) gates.

7. The apparatus of claim 3, wherein the identification indexing circuit includes a second memory to store a modulus (MOD) function table wherein a base of the MOD function is determined by a number of active ports of the MLT and the MOD function is performed on the identification using the MOD function table and a result of the MOD function is used as the index.

8. The apparatus of claim 7 wherein the physical port selector circuit comprises:
    a third memory to store a plurality of MLTs, each of the MLTs having a grouping of port addresses identified in the first memory;
    a fourth memory to store a plurality of numbers of active ports, wherein each stored number of active ports correspond to an MLT stored in the third memory; and
    a second circuit configured to select a port address in the first memory using an identified MLT in the third memory and the index generated by the load sharing circuit.

9. A method comprising:
    identifying a plurality of ports available in a plurality of interface cards in a device; and
    selecting a grouping of ports of the plurality of ports as a Multi-Link Trunk (MLT), at least one port of the grouping of ports is located in an interface card separate from another port of the grouping of ports which is located in another interface card, and wherein the grouping of ports includes two of the plurality of ports; and
    determining if a bandwidth can be channeled by the MLT, and if the bandwidth cannot be channeled by the MLT, then
        selecting one or more ports from the identified plurality of ports, and
        adding the one or more ports to the MLT until the MLT can channel the bandwidth.

10. An apparatus comprising:
    a first circuit to identify a plurality of ports available in a plurality of interface cards in a device;
    a second circuit to select a grouping of ports of the plurality of ports as a Multi-Link Trunk (MLT), at least one port of the grouping of ports is located in an interface card separate from another port of the grouping of ports which is located in another interface card;

a third circuit to determine if a bandwidth can be channeled by the MLT;

an fourth circuit to select one or more ports from the identified plurality of ports if the bandwidth cannot be channeled by the MLT; and a fifth circuit to add the one or more ports to the MLT until the MLT can channel the bandwidth.

11. A processor readable medium which when executed by a processor causes the processor to perform a method comprising:

identifying a plurality of ports available in a plurality of interface cards in a device;

selecting a grouping of ports of the plurality of ports as a Multi-Link Trunk (MLT), at least one port of the grouping of ports is located in an interface card separate from another port of the grouping of ports which is located in another interface card; and determining if a bandwidth can be channeled by the MLT, and if the bandwidth cannot be channeled by the MLT, then selecting one or more ports from the identified plurality of ports, and adding the one or more ports to the MLT until the MLT can channel the bandwidth.

12. An apparatus comprising:

a first memory to store a plurality of Multicast Group Identification (MGID), each MGID identifies a plurality of ports;

a load sharing circuit to transmit a first signal to the first memory;

an MGID selector circuit to transmit a second signal to the first memory, the first signal and the second signal selects an MGID which identifies a plurality of ports in which data is multicasted; and a first circuit configured to select an MGID of a port in which data is received as the MGID, which identifies the plurality of physical ports in which data is to be multicasted, if the receiving port is a port in a Multi-Link Trunk (MLT).

13. An apparatus comprising:

a first memory to store a plurality of Multicast Group Identification (MGID), each MGID identifies a plurality of ports;

a second memory to store a plurality of master MGIDs, each master MGID identifying a plurality of MGIDs;

a load sharing circuit to transmit a first signal to the first memory, the load sharing circuit further comprising, an identification circuit to generate an identification for the data to be multicasted, and an identification indexing circuit to place the identification in one of a plurality of indices, wherein each index has a corresponding MGID, and wherein the identification indexing circuit includes a third memory to store a modulus (MOD) function table wherein a base of the MOD function is determined by a highest number of physical ports in any Multi-Link Trunk (MLT) in the plurality of MGIDs identified by a master MGID, and a MOD operation is performed on the identification using the MOD function table and a result of the MOD function is used as the index; and an MGID port selector circuit to transmit a second signal to the first memory, the first signal and the second signal selects an MGID which identifies a plurality of ports in which data is multicasted, the MGID port selector circuit further comprising a first circuit configured to select an MGID of a port in which data is received as the MGID, which identifies the plurality of physical ports in which data is to be multicasted, if the receiving port is a port in a Multi-Link Trunk (MLT).

14. A method comprising:

assigning at least one Multicast Group Identification (MGID) to a physical port to be used for multicasting in a multicast domain;

determining whether a data receiving port is a physical port in a Multi-Link Trunk (MLT) or a non-MLT port;

if the receiving port is the physical port in the MLT, then assigning an MGID of the receiving port as the multicast domain MGID which identifies a plurality of physical ports to multicast the data; and if the receiving port is the non-MLT port, then
determining a master MGID that is assigned to the multicast domain,
determining a plurality of MGIDs identified by the master MGID,
obtaining an identification for the received data, and
using the identification to determine an MGID in the plurality of MGIDs which identifies a plurality of physical ports to multicast the data.

15. The method of claim 14 further comprising:

determining a highest number of physical ports in any MLT in a plurality of MGIDs identified by the master MGID;

using the highest number of physical ports as base for a modulus (MOD) function;

performing a MOD function on the identification; and using a result of the MOD function as an index to determine one of the MGIDs identified by the master MGID as the MGID identifying a plurality of physical ports to multicast the data.

16. The method of claim 14 wherein obtaining the identification includes selecting a portion of at least a source address and/or a destination address of the data on which Exclusive-OR (XOR) function is performed to generate the identification.

17. A processor readable medium which when executed by a processor causes the processor to perform a method comprising:

assigning at least one Multicast Group Identification (MGID) to a physical port to be used for multicasting in a multicast domain;

determining whether a data receiving port is a physical port in a Multi-Link Trunk (MLT) or a non-MLT port;

if the receiving port is the physical port in the MLT, then assigning an MGID of the receiving port as the multicast domain MGID which identifies a plurality of physical ports to multicast the data; and if the receiving port is the non-MLT port, then
determining a master MGID that is assigned to the multicast domain,
determining a plurality of MGIDs identified by the master MGID,
obtaining an identification for said received data, and
using the identification to determine an MGID in the plurality of MGIDs which identifies a plurality of physical ports to multicast the data.

18. The processor readable medium of claim 17 further comprising:

determining a highest number of physical ports in any MLT in a plurality of MGIDs identified by the master MGID;

using the highest number of physical ports as base for a modulus (MOD) function;

performing a MOD function on the identification; and using a result of the MOD function as an index to determine one of the MGIDs identified by the master MGID as the MGID identifying a plurality of physical ports to multicast the data.

19. A processor readable medium of claim 17, wherein obtaining the identification includes selecting a portion of at least a source address and/or a destination address of the data on which are Exclusive-OR (XOR) function is performed to generate the identification.

* * * * *